United States Patent [19]

Zanzig

[11] Patent Number: 5,293,421
[45] Date of Patent: Mar. 8, 1994

[54] SUMMING AMPLIFIER WITH A COMPLEX WEIGHTING FACTOR AND INTERFACE INCLUDING SUCH A SUMMING AMPLIFIER

[75] Inventor: Hans-Jürgen Zanzig, Weil der Stadt, Fed. Rep. of Germany

[73] Assignee: Alcatel N.V., Amsterdam, Netherlands

[21] Appl. No.: 632,963

[22] Filed: Dec. 20, 1990

[30] Foreign Application Priority Data

Dec. 23, 1989 [DE] Fed. Rep. of Germany ....... 3942757

[51] Int. Cl.$^5$ ............................................. H04M 1/00
[52] U.S. Cl. ...................................... 379/399; 379/403
[58] Field of Search ................. 330/69, 147; 379/399, 379/403, 404, 398, 394, 387, 401

[56] References Cited

U.S. PATENT DOCUMENTS

| | | | |
|---|---|---|---|
| 4,284,859 | 8/1981 | Araseki. | |
| 4,536,716 | 8/1985 | Yoshida et al. | 330/69 |
| 4,599,572 | 7/1986 | Nakayama | 330/69 |
| 4,789,999 | 12/1988 | Meschkat et al. | |
| 4,814,721 | 3/1989 | Zana et al. | 330/69 |
| 4,862,495 | 8/1989 | Stibila | 379/399 |
| 4,866,768 | 9/1989 | Sinberg | 379/399 |
| 4,993,064 | 2/1991 | Jakab | 379/399 |

FOREIGN PATENT DOCUMENTS

| | | |
|---|---|---|
| 2914945 | 10/1979 | Fed. Rep. of Germany. |
| 3343707 | 10/1979 | Fed. Rep. of Germany. |
| 3428106 | 2/1986 | Fed. Rep. of Germany. |
| 224703 | 7/1985 | German Democratic Rep.. |

OTHER PUBLICATIONS

W. C. DeVito, "Non-Inverting Summing Amplifier", IBM Technical Disclosure Bulletin, vol. 24, No. 11B, Apr., 1982, pp. 5961–5962.
E. J. Kennedy, "Operational Amplifier Circuits", Holt Reinehart & Winston, Inc., Theory and Applications, N.Y., 1987, pp. 7–23.
Miklos Herpy, "Operational Amplifiers and Analog Multipliers", Wiley-Interscience Publication, Analog Integrated Circuits, Budapest, 1980, pp. 245–252.
K. Steinbuch, W. Rupprecht, "Nachrichtentechnik", Springer-Verlag, Berlin, 1973, pp. 235–241.

Primary Examiner—James L. Dwyer
Assistant Examiner—Jack Chiang
Attorney, Agent, or Firm—Robbins, Berliner & Carson

[57] ABSTRACT

Summing amplifiers may be constructed from feedback operational amplifiers. The weighting factors are quotients of the feedback resistance common to all quantities to be summed and the individual dropping resistances. Only the feedback resistance has a directly proportional effect, while the effects of the individual dropping resistances are inversely proportional. The formation of specified complex weighting factors is difficult, especially if the summing amplifier is intended for use in a two-wire/four-wire interface between a subscriber line and a telecommunications network and is to be mass produced at low cost as an integrated circuit. By means of a two-stage summing amplifier in which the second stage (VS2') sums with real factors, while complex factors are implemented in the first stage (VS1'), both balanced- and unbalanced-to-ground interfaces can be implemented in a simple manner with only one capacitance. Common-mode signals are simple to evaluate (SSE); common-mode signalling (DS) is possible.

4 Claims, 2 Drawing Sheets

SUMMING AMPLIFIER WITH A COMPLEX WEIGHTING FACTOR AND INTERFACE INCLUDING SUCH A SUMMING AMPLIFIER

TECHNICAL FIELD

The present invention relates to a summing amplifier with a complex weighting factor and to a two-wire/-four-wire interface including such a summing amplifier.

CLAIM FOR PRIORITY

This application is based on and claims priority from an application first filed in Federal Republic of Germany on Dec. 23, 1989 under Ser. No. 39 42 757.9. To the extent such prior application may contain any additional information that might be of any assistance in the use and understanding of the invention claimed herein, it is hereby incorporated by reference.

Two-wire/four-wire interfaces or hybrid circuits have been used in telephone and transmission systems for a long time. Hybrid circuits are three-port networks designed to isolate a receiver (e.g., the receiver of a telephone set) from a transmitter (e.g., the transmitter of a telephone set), but to couple both to a two-wire line. To accomplish this, an impedance-simulating network is necessary is addition to the hybrid circuit, cf., for example, K. Steinbuch, W. Rupprecht, "Nachrichtentechnik", Springer-Verlag Berlin u.a., 1973, pp. 235-241. The German Bundespost currently requires a network simulating an impedance which is presented by a 220-ohm resistor in series with the parallel combination of an 820-ohm resistor and a 115-nF capacitor. Other postal administrations specify the same arrangement with similar values. Particularly for those devices that must be present for each subscriber, a reduction of cost and complexity is urgently necessary. Therefore, these devices, which also include the two-wire/four-wire interfaces with the impedance-simulating networks contained therein, are, as far as possible, implemented as integrated circuits. A special problem in integrated circuits are the capacitances. A minimum requirement is that, instead of a predetermined capacitance value, another value can be substituted, and the required property may be achieved nevertheless. A two-wire/four-wire interface has to meet different requirements. Many prior art designs therefore include a number of impedances with a capacitive component which must have a predetermined relationship to each other. The tolerances of the components must then be very tight, because deviations of the absolute value frequently have less effect than mutual deviations. The aim is, therefore, to manage with as few impedances as possible, ideally with only one impedance.

Depending on their design, two-wire/four-wire interfaces include one or two feedback loops. Due to the impedance presented by the two-wire line, phase relationships are present that are not equal to either 0 degrees or 180 degrees. This is equivalent to a summation of voltages with a complex weighting factor.

As is well known, the output voltage of a summing amplifier with a feedback operational amplifier is obtained by applying Kirchhoff's first law to the inverting input of the operational amplifier:

$$Ua = R(U1/R1 + U2/R2 \ldots)$$

where R = feedback resistance
U1, U2, ... = voltages to be summed, and
R1, R2, ... = dropping resistances through which these voltages are applied to the inverting input.

As can be easily seen, only the feedback resistance R, which is common to all weighting factors, has a directly proportional effect. The series resistances, which act individually, have an inversely proportional effect.

As a rule, this is of no significance as long as the weighting factors are real, so that all references are purely ohmic. If the weighting factors are complex, this limitations will mostly be undesirable. This applies particularly if the weighting factor is to be equal to a real multiple of a predetermined complex impedance, as is the case with the above-mentioned interfaces.

DISCLOSURE OF INVENTION

It is the object of the invention to provide a summing amplifier with which complex weighting factors can be achieved in a simple manner and which is, therefore, especially suited for two-wire/four-wire interfaces.

By means of a two-stage summing amplifier in which the second stage sums with real factors, while complex factors are implemented in the first stage, both balanced- and unbalanced-to-ground two-wire to four-wire interfaces can be implemented in a simple manner with only one capacitance. Common-mode signals are simple to evaluate (SSE); common-mode signalling (DS) is possible.

BRIEF DESCRIPTION OF DRAWINGS

The invention will now be explained in greater detail with reference to the accompanying drawings, in which.

BEST MODE FOR CARRYING OUT THE INVENTION

Figure 1:
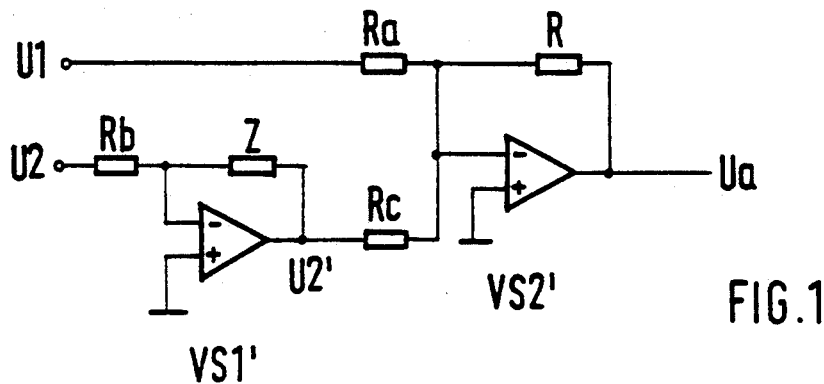
FIG. 1 shows a summing circuit in accordance with the invention.

The summing amplifier of FIG. 1 has two amplifier stages VS1' and VS2'. The first amplifier stage VS1' includes an operational amplifier whose noninverting input is grounded and whose inverting input is connected, on the one hand, via a dropping resistor Rb to a voltage U2 and, on the other hand, via an impedance Z to the output of the amplifier. The voltage at this output is then $$U2' = U2\, Z/Rb.$$

The gain is thus equal to a real multiple of the complex value Z. If the dropping resistor Rb is replaced with an impedance, a further degree of freedom is obtained.

The second amplifier stage VS2' includes an operational amplifier whose noninverting input is grounded and whose inverting input is connected via a dropping resistor Ra to a voltage U1, via a dropping resistor Rc to the voltage U2', and via a feedback resistor R to the output of this amplifier. The voltage at this output is then $U_a = U_2 Z R_c/(R R_b) + U_1 R/R_a$.

Figure 2:
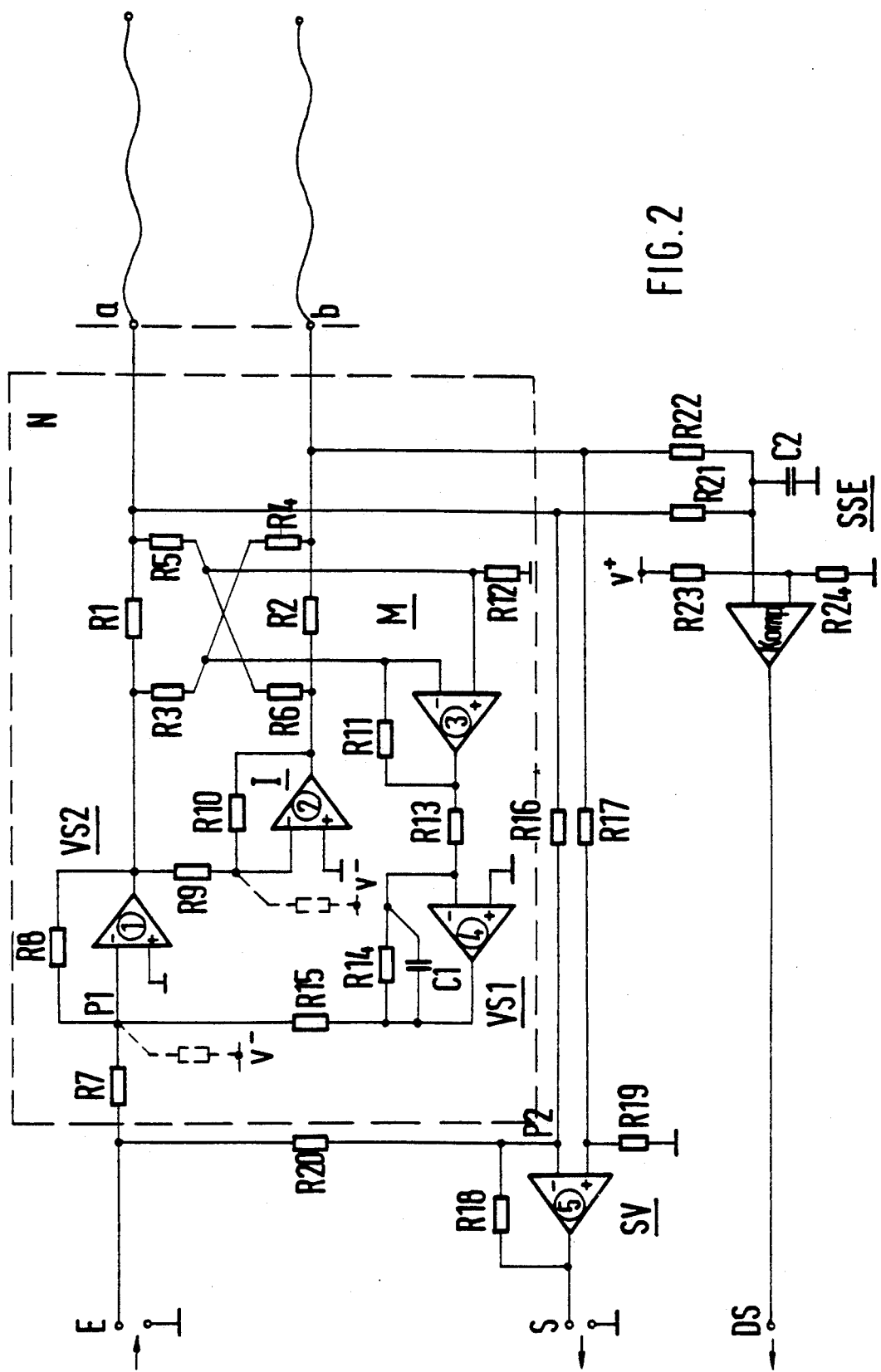
FIG. 2 shows an embodiment of an interface in accordance with the invention which includes a summing circuit in accordance with the invention.

The interfaces circuit shown in FIG. 2 serves to interface a unidirectionally operated receive line E and a unidirectionally operated transmit line S with a bidirectionally operated two-wire line a, b.

The two-wire line a, b is terminated with an impedance simulating network N. The incoming signal on the receive line E is fed into the impedance-simulating network N through a summing amplifier included in the simulating network, namely the amplifier stage VS2, and thus reaches the two-wire line a, b. Toward the transmit line S, the interface includes a transmitting amplifier SV which, on the one hand, evaluates the voltage across the two-wire line a, b by being connected as a differential amplifier and, on the other hand, adds an in-phase signal proportional to the voltage across the receive line E to compensate for that portion of the voltage across the two-wire line a, b which comes from the receive line E. A control-signal receiver SSE in the form of a Schmitt trigger compares the potential of the two-wire line a, b with a predetermined threshold value to derive a digital signal DS from a common-mode signal aplied to the two-wire line a, b. In principle, instead of a digital signal, an analog signal could be transmitted as a common-mode signal. Prerequisites for this would be negligible common-mode interference signals and a control-signal receiver SSE in the form of an amplifier circuit rather than a Schmitt trigger. In any case, the fact that the two-wire line a, b is terminated for common-mode signals not in its characteristic impedance but in a resistance must be taken into account.

The interface usually forms part of a subscriber line circuit. The other functions are not shown here.

Figure 3:
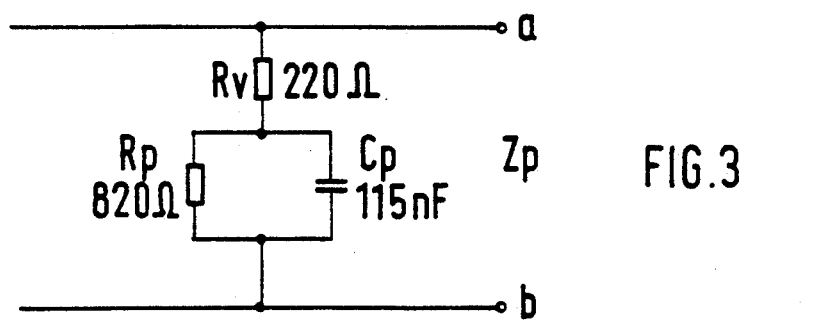
FIG. 3 shows the design of the impedance to be simulated.

The impedance to be simulated is illustrated in FIG. 3. It consists of a resistor Rv in series with a complex partial impedance Zp formed by a parallel combination of a resistor Rp and a capacitor Cp.

This impedance is simulated by the network N of FIG. 2. The embodiment shown is balanced with respect to ground and permits the signal on the receive line to be fed in without the need for frequency-response compensation. It is also possible to inject this signal, e.g., together with the remote supply current, directly into the two-wire line a, b by employing the current feed system. An example of a current feed system is shown in U.S. Pat. No. 4,789,999 entitled "LINE CIRCUIT FOR COUPLING A SUBSCRIBER SET TO A SWITCHING FACILITY TO PROVIDE A COMPLEX IMPEDANCE MATCH (feed circuit 1 in FIG. 3).

The impedance-simulating network N of FIG. 2 includes a measuring arrangement M, a two-stage amplifier consisting of an amplifier stage VS1 and the above-mentioned amplifier stage VS2, and an inverter I. The measuring arrangement M includes two current-sensing resistors R1 and R2, which also are the terminating resistors of the two-wire line with respect to direct current. If a particular value is specified or advantageous for them, it can be used directly. Otherwise, $R1 = R2 = Rv/2$ is advantageous. Since the gain of the measuring arrangement M and the following amplifier can be chosen freely, however, arbitrary values can be chosen for the current-sensing resistors, which, however, must be equal for reasons of symmetry. They must not be greater than Rv/2, however. Since superposed common-mode currents are assumed in the present case, a voltage which does not contain the common-mode component is taken off by means of a bridge circuit consisting of resistors R3, . . . , R6.

The two-stage amplifier amplifies the output signal from the measuring arrangement M in such a way that its output voltage is to the output current as the complex partial impedance is to the output current. Its gain must thus be equal to a real multiple of this partial impedance. The gain of a feedback operational amplifier is proportional to its feedback resistance (R8 in the case of VS2) and inversely proportional to its dropping resistance (R15 in the case of VS2). An amplifier whose feedback path contains the predetermined partial impedance Zp and which is preceded by an ohmic dropping resistance will therefore have the required gain. A similar impedance whose components have the same relationship to each other as in the partial impedance Zp will have the same effect if the dropping resistance is changed correspondingly. An amplifier stage with real gain, like the second amplifier stage VS2, does not alter the basic action, either.

The division of the amplifier into two stages including a stage with real gain has the advantage that an additional signal, here the signal from the receive line E, can be readily added. If this is not necessary, e.g., if this signal is fed into the two-wire line directly as mentioned above, a single-stage amplifier will be sufficient.

A single-stage amplifier can also be used as a summing amplifier. Then, however, either the dropping resistor with which the signal from the receive line is added must be replaced with an impedance having the same complex structure as the feedback impedance, or the dropping resistor (here R15) with which the signal from the measuring arrangement M is added must be replaced with an impedance which is inversely proportional to the partial impedance Zp.

Through an inverter I together with the second current-sensing resistor R2, the circuit is balanced with respect to ground. Both can be omitted if no balance is required.

The potentials of both wires of the two-wire line a, b can be raised or lowered with respect to ground by adding a DC voltage at the noninverting inputs of the second amplifier stage VS2 and the inverter I via additional dropping resistors. In FIG. 2, this is indicated by a broken line.

Figure 4:
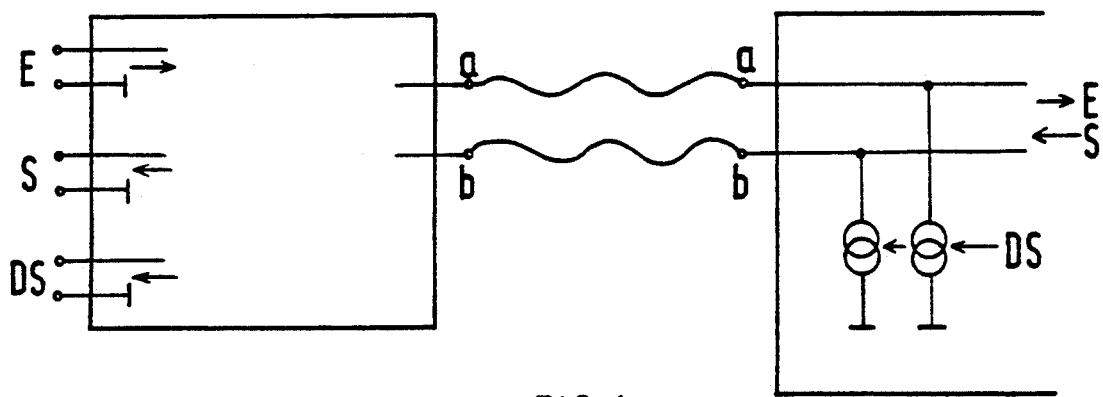
FIG. 4 shows a preferred application.

A preferred application is illustrated in FIG. 4. The left-hand portion shows highly schematically the interface containing the impedance-simulating network, and the right-hand portion shows a telephone terminal connected to the interface by the two-wire line. The telephone terminal is shown only as far as the generation of the control signal, i.e., the digital signal DS, is concerned. Each of the wires a and b of the two-wire line is grounded through a controlled current source which is controlled by the digital signal DS.

I claim:

1. Interface between a bidirectionally operated two-wire line, a unidirectionally operated receive line and a unidirectionally operated transmit line, said interface comprising a first branch from the receive line to the two-wire line;

a second branch from the two-wire line to the transmit line;

a third branch from the receive line to the transmit line; and a network terminating the two-wire line and simulating a complex impedance consisting of a resistor in series with a complex partial impedance, said network further comprising a two-stage amplifier for producing a first output current with an associated gain relative to an input voltage, said associated gain being equal to a real multiple of said complex partial impedance, said two-stage amplifier further comprising a first operational amplifier having an output and an inverting input, a purely ohmic feedback resistor directly coupled between the output and the inverting input of the first operational amplifier such that no capacitive or inductive components are coupled between the output and the inverting input of the first operational amplifier, a purely ohmic first dropping resistor directly coupled between the inverting input and a first circuit point coupled to the first signal voltage such that no capacitive or inductive components are coupled between the inverting input and the first circuit point, a purely ohmic second dropping resistor directly coupled between the inverting input of the first operational amplifier and a second circuit point such that no capacitive or inductive components are coupled between the inverting input of the first operational amplifier and the second circuit point, a purely ohmic third dropping resistor directly coupled between a third circuit point and a fourth circuit point coupled to the second signal voltage such that no capacitive or inductive components are coupled between the third circuit point and the fourth circuit point, an additional operational amplifier also having an output and an inverting input, said additional operational amplifier being directly coupled between said second and third circuit points, and a complex feedback impedance directly coupled between the output and the inverting input of the additional operational amplifier, wherein said complex weighting factor is established only by said feedback resistor, said first dropping resistor, said second dropping resistor, said third dropping resistor, and said complex feedback impedance;

first output means comprising a first current-sensing resistor for coupling said first output current to a first terminal of said two-wire line such that current flowing through said first current-sensing resistor is representative of current flowing through the network; and measuring means responsive to the current flowing through said first current-sensing resistor for deriving said input voltage.

2. An interface as claimed in claim 1, further comprising an inverter for producing a second output current having a polarity opposite that of said first output current, second output means comprising a second current sensing resistor having the same value as the first current-sensing resistor for coupling said second output current to a second terminal of said two-wire line such that current flowing through said second current-sensing resistor is also representative of the current flowing through the network.

3. An interface as claimed in claim 2, wherein the first operational amplifier and the inverter are at a common reference potential with respect to ground, and the interface further comprises a common-mode-signal receiver for detecting any signals on the two-wire line which are not equal with respect to ground.

4. An interface as claimed in claim 3, wherein the reference potential with respect to ground is different from zero and greater than a predetermined range of common-mode interference signals, and the common-mode-signal receiver responds digitally to those common-mode signals which exceed said reference potential.

* * * * *